Aug. 15, 1967     E. SOHM     3,335,521
METHOD FOR CULTIVATION OF CHAMPIGNONS
Filed Aug. 5, 1965
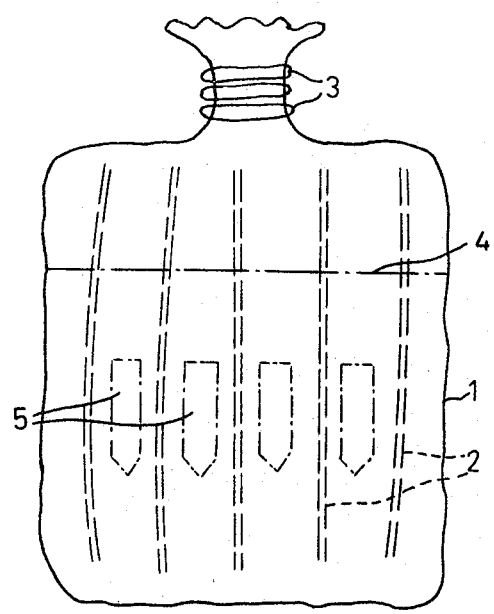
INVENTOR:
Elmar Sohm
By Alvin Browdy
Attorney

3,335,521
METHOD FOR CULTIVATION OF CHAMPIGNONS
Elmar Sohm, Im Wiesengrund 7, Lauterach, Austria
Filed Aug. 5, 1965, Ser. No. 477,371
Claims priority, application Germany, Aug. 8, 1964,
S 92,544
4 Claims. (Cl. 47—1.1)

The invention relates to a method of cultivating champignons from pasteurized compost by mixing nutrient medium of organic nature being vaccinated or injected with champignon mycelium, preferably grain, therewith, storage of the compost at a given temperature until growing of the champignon mycelium, applying of a covering layer on the thus developed substratum for stimulating of a fruit-knot formation, as well as storage at a given temperature, until such fruit-knot formation; furthermore the invention relates to devices for performing such method.

In the preferably applied method of the above-mentioned type, straw mixed with horse manure will be deposited in piles of predetermined size, for example 1.5 m. in height, 1.2 m. in width and 15 m. in length. Thus exothermic chemical reactions will take place in the manure, leading to a calefaction of 85° C. within a few hours. This calefaction requires a pre-decomposition, which is not an object of this present invention.

After accomplishment of the pre-decomposition, the compost will be shifted, while organic additive matter (for example draff, i.e., refuse grain from breweries and distilleries, cottonseed flour, chicken manure and the like) and water will be added. Right after the preceding treatment the compost will be left in its place. This process may be repeatedly done. Then the compost will be ready for pasteurizing.

For pasteurizing the compost will be piled up on boxes or shelves in the pasteurizing rooms to a height of less than 30 cm. and preferably 23 cm. It is to be understood that these rooms on account of pasteurizing, are free of vermin, especially nematodes, which will impair the cultivation of champignons. In said pasteurizing rooms will now take place a heating-up of the compost to 55–60° C., to maintain the necessary moisture. The compost will now remain at the latter under a moisture of 100% for approximately a week, while fermentation and growing of useful mushrooms (Actytnomycetes), as well as dying-off of animal and vegetable vermin will take place.

Completion of pasteurization will be followed by a temperature decrease of the compost to approximately 24° C. There will now be mixed into the compost grains, the champignon mycelium. The compost will be left at said temperature for about 14 days, during which time it will be completely interwoven and intergrown respectively, by mycelium. The compost interwoven by mycelium, will hereinafter be referred to as substratum. The spawn is the freshly injected compost or the substratum.

To stimulate growth of champignon fruit-bodies, in the substratum, an application of a covering layer will be applied thereon, consisting of German standard soil, soil and chalk or tuff sand, lime and peat, for example. Consequently, the substratum, covered with such covering layer will remain at a temperature slowly falling from 20 to 16° C. for about 18–20 days. After such time interval the champignon fruit-bodies will have been formed.

The mushroom can be harvested three to four days after growing of the champignon fruit-bodies. The nutrient soil will remain productive for 35–65 days. After this period, the nutrient soil, which will be exhausted for raising champignons, can be sold to gardening plants as fertilizer, or may be prepared as nutrient soil in repetition, wherein the latter case the previously described method and steps of mixing and covering will be repeated.

The known methods for cultivation of champignons are not restricted to the use of horse manure, but there may be used synthetic composts, which at the present are much more disadvantageous, seen from a standpoint of cost. The method, according to the invention, is therefore in respect to the choice of basic materials, not limited by any restrictions.

The known methods for cultivation of champignons were previously performed in such a manner that the producing of the substratum, intergrown with champignon mycelium, as well as the proper harvesting of the grown mushrooms were done at the some processing plant. Erection of sterile localities for pasteurization of the compost requires rather large investments, leaving only a few, locally far apart, large plants for covering a relatively high consumption. This presents a disadvantage, because the distance of the merchandise to the ultimate consumer will be very far, which in turn impairs the freshness of the food stuff. Additionally, the packing of the mushrooms—to guarantee their freshness—involves relatively high costs, which in turn cause an increase in price. The problem is furthermore compounded by the competition of canned mushrooms which, while qualitatively inferior to freshly harvested uncanned mushrooms, are not inferior to old uncanned mushrooms, i.e., those having been stored too long on their way to the consumer.

It is an object of the present invention to provide a method, according to which the proper production proceedings of the mushrooms to be cultivated, will not be limited to a few key-point installations, but may be practically performed at the place of the consumer, without necessitating large investments, especially for the erection of sterile cultivation rooms.

According to the invention this may be generally achieved by filling the compost, having been mingled with the vaccinated nutrient carriers and the substratum respectively, at the latest before applying the covering layer, into air-proof ready-for-shipment covers, namely sacks, and continuing the storage in a place outside of the pasteurizing room, which does not have to be sterile.

In such an application of the method, the numerous small scale enterprises, which do not have the facilities necessary for accomplishing the high requirements of sterility, especially in regards to nematodes, may be supplied with intergrown substratum by a few key-point installations over great distances, whereby forming of the fruit-knots in the substratum will mainly take place at the location of the producer. Thusly, the distance to the ultimate consumer will be greatly reduced.

The application of the method according to the invention was previously objected to by expert opinion, inasmuch as it seemed impossible to ship intergrown substratum in covers, namely sacks, as the champignon mycelium forming the intergrowth would be lacerated.

The present invention is based on the recognition, according to which impairment of the champignon mycelium during shipment thereof does not have any influence at all on either the quantity or the quality of the yield. On the contrary, there will be a further advantage of a higher yield, originating from a higher pile-up of champignon mycelium to be attained in the sacks. It may be known that the yield will increase with the height of the substratum pile, yet this could not be realized so far during pile-ups of the compost on chests or shelves in the pasteurizing rooms, for practical reasons.

The filling of the compost and substratum respectively, will at the earliest take place after completion of pasteurization, preferably, after intergrowing with champignon mycelium. The covers and sacks respectively, which are filled with substratum and sent to the producer, will be opened by the latter at their upper ends, rolled down a short distance and provided with a covering layer. The cultivation of the fruit-knots and mushrooms, respectively, will entirely proceed at the producer's.

The dumping height of the compost and substratum respectively, in the air-proof covers and sacks respectively, will be preferably in the order of 60–80 cm. This will add—as previously mentioned—to the increase of yield, as the dumping height according to known methods in the pasteurizing rooms amounts to less than 30 cm. at its maximum.

For better carrying out of the method according to the invention, it is possible to fill the compost to be pasteurized into air-pervious covers, preferably perforated sacks, instead of chests or shelves thus far used, which will subsequently be treated in the pasteurizing room, according to the described manner. For shipping, i.e., at the latest prior to applying the covering layer, the perforated covers will be inserted into air-tight covers and sacks, respectively. The air-perviousness of the inner covers provides not only for sufficient oxygen supply, but also for penetration of steam, serving as thermostatic agent during pasteurization and consequently, the matinenance of the necessary moisture will be guaranteed.

The material being used, for the perforated and non-perforated covers respectively, consists preferably of synthetic foil, especially sheets of polyethylene.

To guarantee maintenance of the necessary moisture during shipment, as well as a certain thermostatic action within the covers, the latter may be provided, prior to shipment, with chunks of ice or means giving off heat slowly, for example. This supply may be stored in closed bags or in pockets, supplied on the covers and bags, respectively.

An efficient apparatus for performing the method according to the invention comprises conveyor belts within the pasteurizing rooms for pasteurizing of continuously added compost, as well as bagging of the latter into waiting covers. The arrangement of such conveyor belts is to be looked upon as being much more efficient than the previously performed manner of piling the compost in chests or shelves. The application of compost on conveyor belts is much more rational and time-saving, than any other known kind of this processing step, so far.

According to another object of this invention it is advantageous to provide the sack-like covers, especially the perforated sacks, inasmuch as the latter are chosen for carrying out of the method, with stiffeners for improving their stability. Such stiffeners especially facilitate insertion of such a perforated sack into a non-perforated sack.

An illustrative embodiment of a sack-like cover for putting the invention into practice will be described in detail in the drawing.

According to the drawing a sack 1, comprising wooden, metal or syntheic material stiffeners in form of sticks 2, shown in dashed lines, consists of sheets of polyethylene.

The stiffeners may be in the shape of ribs, of the same material as sack 1 and formed in one with the latter. Such stiffeners are not essential in carrying out the method, according to the invention. Sack 1 is filled with compost or substratum. Its upper end is tied with a string 3. According to the embodiment of the method, according to the invention, sack 1 will be only filled with compost and substratum respectively, to a height, indicated by a dot-dash line 4. When the sack has arrived at the location intended for cultivation, it will be opened and the compost will be spread apart. Subsequently, the sack will be folded down on its side, but only so much as to provide a lateral depositing area for the covering layer, to be applied later on. The compost and substratum respectively, will be covered with a covering layer, until such sack is completely filled.

The inner surfaces of sack 1 may be provided with pockets 5 (shown in dot-dash lines) for receiving ice therein, which—as previously described—will serve as a thermostatic agent for the compost and substratum, respectively, during shipment. The maintenance of the moisture of the interior of the closed sack during shipment, storage and harvesting time is essential.

I claim:

1. In a method for the packaging of uncased champignon spawn for shipment to a site of cultivation, wherein compost has been pasteurized, champignon mycelium injected into the compost to provide the spawn, and the spawn has been stored at a given temperature until intergrown with champignon mycelium, the improvements comprising shipping said spawn with a thermostatic agent comprising ice in an air-tight container.

2. Method according to claim 1, wherein the injection of said champignon mycelium into said compost is carried out with said compost in said container.

3. Method according to claim 1, wherein said compost has been placed into an air pervious perforated sack prior to the pasteurization of said compost, and then after said pasteurization and after said injecting of said mycelium into said compost and immediately prior to said shipping, placing said perforated sack and contents into said air-tight container for said shipping.

4. Method according to claim 3, wherein said perforated sacks and non-perforated containers are formed of synthetic polymeric material.

References Cited

UNITED STATES PATENTS

| 2,034,678 | 3/1936 | Knaust et al. | 47—1.1 |
| 2,385,866 | 10/1945 | Kuehner | 47—34.11 X |
| 2,851,821 | 9/1958 | Guiochon | 47—1.1 |
| 3,177,615 | 4/1965 | Rowe | 47—1.1 |

ABRAHAM C. STONE, *Primary Examiner.*

ROBERT E. BAGWILL, ANTONIO F. GUIDA,
*Examiners.*